United States Patent Office 2,766,017
Patented Oct. 9, 1956

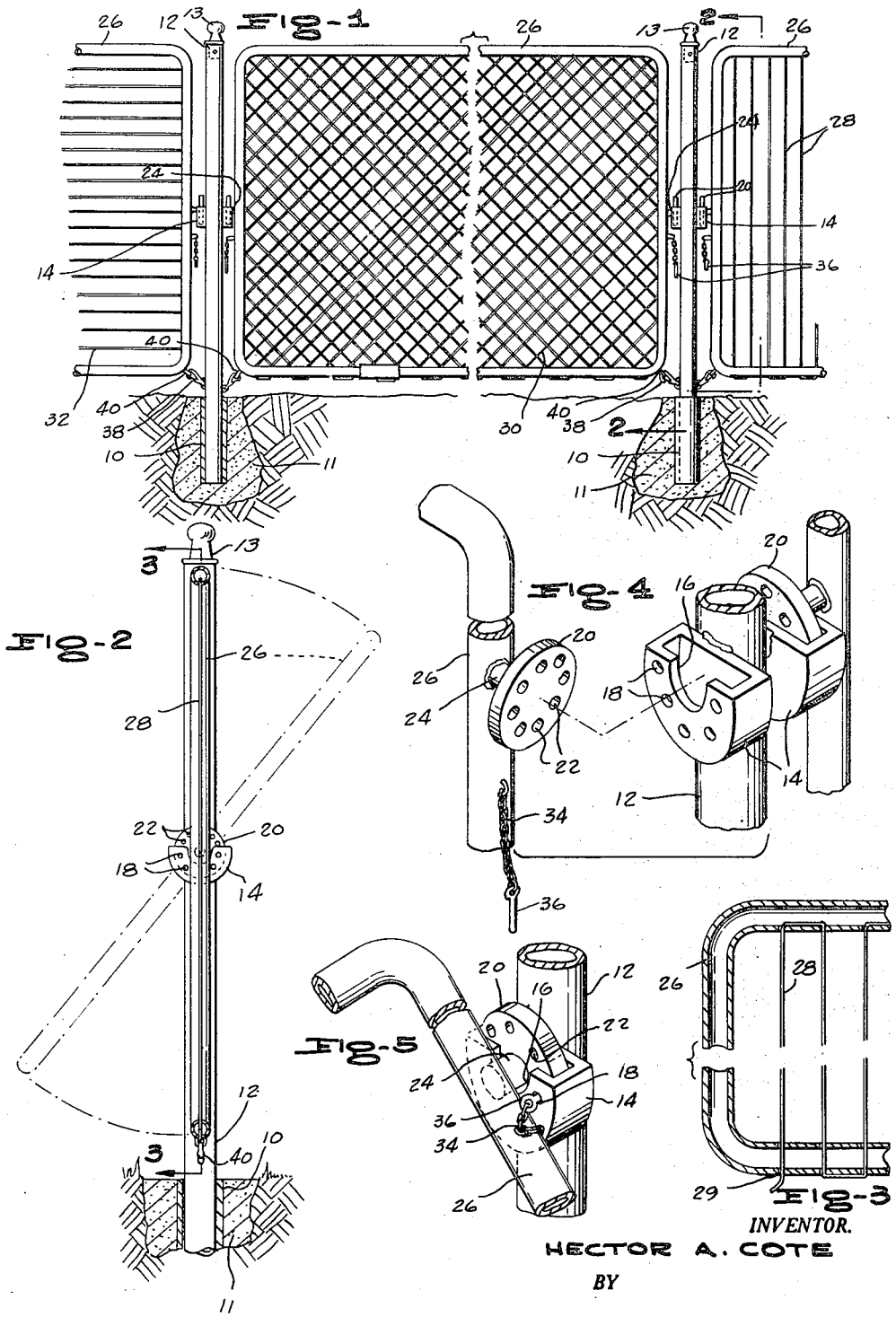

2,766,017

TILTABLE FENCE

Hector A. Cote, Bayside, Va.

Application September 23, 1955, Serial No. 536,230

4 Claims. (Cl. 256—23)

Summarized briefly, the present invention is a fence comprising a plurality of individual sections alternating with stationary posts, with each section being individually tiltable upon the posts supporting it. Means is provided, adapted for interengagement between the fence sections and posts, for locking the sections in selected positions to which they are tilted, if desired, and additionally, each section may be bodily removed, thus to permit dismantling of an installed fence whenever desired.

By way of background, it may be observed that in many instances fences interfere with maintenance of a lawn due to the fact that it is difficult to cut grass at the base of the fence. Apart from this, conventional fences have the undesirable characteristic that they are permanent installations, except perhaps when they are light, insubstantial structures, and as a result, one who erects a fence is prevented from taking any part thereof to a new location if he should move.

The fence formed according to the present invention is so designed as to eliminate these undesirable characteristics of conventional fence constructions, and in accordance with the present invention, is capable of being tilted sufficiently to expose the ground surface beneath the same, thus to make said surface readily accessible to a lawn mower, clipper, or the like. Further, through the use of removable sections and posts, all portions of the fence with the possible exception of the post support sockets thereof may be removed for transport to a new location.

Another object of importance is to provide a fence of the type referred to which will be adapted to be installed with maximum speed and ease, and without the requirement of expert workers.

A further object is to provide a fence as described which will be attractive, substantial, and adapted for wide variations in respect to the design thereof.

Other objects will appear from the following description, the claims appended thereto, and from the annexed drawing, in which like reference characters designate like parts throughout the several views, and wherein:

Figure 1 is a front elevational view of a fence formed according to the present invention, only a fragmentary portion of said fence being illustrated, parts being broken away and other parts being shown in section;

Figure 2 is an enlarged vertical section on line 2—2 of Figure 1, with parts broken away, the dotted lines showing a fence section in tilted position;

Figure 3 is an enlarged, fragmentary section on line 3—3 of Figure 2, with parts broken away;

Figure 4 is a fragmentary, partly exploded perspective showing the means for connecting the fence sections to an adjacent post; and Figure 5 is a fragmentary perspective view showing the post and adjacent connected section, with the section adjusted to a tilted position.

In Figure 1, there are shown three fence sections, each with a different type of wire mesh or lacing. This is shown purely by way of example, and in an actual installation, ordinarily all the sections would have the same type of mesh.

In erecting the fence, one embeds upwardly opening, cylindrical sockets 10 in concrete as at 11, at uniformly spaced intervals along the line which the fence is to follow.

Removably engaged at their lower ends in the several sockets 10 are upstanding posts 12, which may be of solid or tubular formation, and if tubular, may be suitably capped in a manner well known to those working in the art, as by ornamental caps 13 having bases received in the posts and connected to the posts by a rivet.

Welded or otherwise fixedly secured to each post 12, intermediate opposite ends thereof, at diametrically opposite locations on the post, are upwardly opening, semicircular cradles 14 each of which has flat inner and outer walls cooperating with the curved connecting wall or web of the cradle to define a semicircular, deep recess. Formed in the outer wall is an upwardly opening bearing recess 16, and extending in an arcuate series about said recess are apertures 18.

Each cradle is adapted to receive a flat disc 20 having a marginal series of openings 22. Each disc 20 is fixedly connected, by means of a short stub 24, to the adjacent end of a rectangular fence section 26.

As shown in Figure 1, each fence section includes a rectangular, tubular frame, and in one embodiment of the invention, shown at the right in Figure 1, the fence sections may include a net or wire mesh body composed of a single wire 28 laced between the top and bottom rails of the frame as shown in Figure 3. The bottom rail preferably has openings 29 in its underside, with the mesh being laced through said openings, while the top rail has openings only in its underside, rather than at diametrically opposed locations thereupon. The purpose of the openings 29 is to permit drainage of any water that may accumulate within the tubular frame of the section.

In another embodiment, shown at the center in Figure 1, the wire forming the mesh may be laced diagonally of the frame at opposite directions as at 30, while in still another embodiment, the wire may be laced only horizontally as at 32. Obviously, various other lacing arrangements can be followed, those shown being merely examples of some arrangements that can be employed.

Connected to the opposite ends of each fence section, immediately below the discs 20, are chains 34, carrying at their free ends detents or locking pins 36.

Each section has discs 20 at opposite ends thereof, coaxially aligned to permit tilting of the section about the horizontal axis extending between the ends thereof, defined by the coaxial stubs 24. Thus, after the several posts 12 have been inserted in the sockets, it is merely necessary to dispose each section between adjacent posts, with the disc 20 seating in the confronting cradles or disc housings 14 of said posts. This tiltably mounts the fence to turn about the axis of stubs 24, as will be readily noted from Figure 2. Ordinarily, the fence is vertically disposed, and under these circumstances, is kept in a vertical position by clips or spring clasps 38 connected to diametrically opposite portions of each post at the base thereof, and engageable within depending eyes 40 secured to the lower corners of each frame.

At such time as it may be desired to tilt a fence, so as, for example, to permit cutting of the grass between posts 12, one detaches clasps 38 from eyes 40, and swings the fence to a selected inclined position. The fence may be locked in said position as shown in Figure 5 by insertion of pin 36 through a selected opening 18, and through an opening 22 of disc 20 registered with said selected opening.

Alternatively, any fence section can be removed bodily, merely by being lifted to remove the disc 20 from the associated cradles 14. Thus, the fence can be dismantled in very short order, by removing the several fence sections and then lifting the posts 12 out of the sockets 10, leaving only the sockets in the ground, thus permitting the fence to be moved to a new location.

Still further, if for example one desired to drive a vehicle onto the property, a number of sections could be removed, together with selected posts 12, and subsequently replaced with little difficulty.

Another important characteristic resides in the fact that the fence can be erected by the householder without the requirement of skilled labor, and though requiring little maintenance, can be easily repaired or maintained by removing any section needing maintenance and carrying it to a work bench where the work can be best performed.

Still other important characteristics are believed to reside in the fact that the fence is attractive, of rugged construction, capable of manufacture at relatively low cost, well adapted for more or less temporary erection as well as permanent erection (such temporary erection might be desired, for example, by trailer owners), and attractively designed so as to fit into any surroundings.

It should be noted that although not shown, caps would be provided for the sockets, to cover the same when the fence is dismantled, so that they will not be blocked with soil. This would permit the next tenant or home-owner to readily install the same type of fence. A snap-on cover, having depending leaf springs, can be advantageously employed for this purpose.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A tiltable fence comprising a plurality of spaced, upstanding posts; a pair of upwardly opening, approximately semicircular cradles secured to each post at diametrically opposite locations thereon, whereby to arrange the cradles in pairs with the cradles of each pair confronting one another across the space between adjacent posts; and fence sections each extending within said space and including discs secured to its opposite ends, said discs being rotatably mounted in the confronting cradles, for tiltable adjustment of each fence section independently of any other section.

2. A tiltable fence comprising a plurality of spaced, upstanding posts; a pair of upwardly opening, approximately semicircular cradles secured to each post at diametrically opposite locations thereon, whereby to arrange the cradles in pairs with the cradles of each pair confronting one another across the space between adjacent posts; and fence sections each extending within said space and including discs secured to its opposite ends, said discs being rotatably mounted in the confronting cradles, for tiltable adjustment of each fence section independently of any other section, each cradle having at least one opening formed in a wall thereof and each disc having a marginal series of openings any of which is registrable with said one opening, each fence section including a pin removably engageable in registering openings of the disc and cradle for holding the associated fence section in a selected position of adjustment.

3. A tiltable fence comprising a plurality of upwardly opening sockets adapted to be embedded in the ground; a plurality of posts removably engaged at their lower ends in said sockets; a pair of cradles carried by each post, each cradle being of semicircular formation and including an upwardly opening, semicircular bearing recess, the cradles of each pair being secured to diametrically opposite portions of the associated posts; a plurality of fence sections, each extending between adjacent posts and including at its opposite ends discs fixedly secured to the fence section and aligned coaxially with one another, the discs of each fence section being rotatably and removably seated in the recesses of the cradles adjacent the ends of the section, for tiltably mounting each section upon the posts disposed at opposite ends thereof; and means on the post and fence sections for interengaging the sections with the posts against movement of any section from a selected position to which it is rotatably adjusted.

4. A tiltable fence comprising a plurality of upwardly opening sockets adapted to be embedded in the ground surface; posts removably engaged at their lower ends in the several sockets; bearing cradles secured to diametrically opposite portions of each post, each bearing cradle having an upwardly opening, semicircular recess and being formed with at least one opening in a wall of the cradle communicating with said recess; a plurality of fence sections each extending between adjacent posts, each section comprising a peripheral frame and a lacing bounded by said frame; coaxial discs fixedly secured to the opposite ends of the frame of each section and formed each with a marginal series of apertures, said discs removably engaging in the recesses of adjacent cradles for rotatably mounting each fence section upon the posts adjacent the same; a locking pin carried by each fence section adjacent a disc of the section, said locking pin being removably engageable in said opening of an adjacent cradle and in an aperture of the disc seating in said cradle to hold the fence section in a selected position of rotatable adjustment; and means for retaining each fence section in a normal position in which it extends within a vertical plane, comprising a clasp and eye connection between the section and at least one of the posts adjacent thereto.

References Cited in the file of this patent

UNITED STATES PATENTS

| 1,387,955 | Wilburn | Aug. 16, 1921 |
| 2,329,259 | Freeman | Sept. 14, 1943 |